United States Patent
Ma

(10) Patent No.: US 11,327,304 B2
(45) Date of Patent: May 10, 2022

(54) WINDSHIELD HEAD-UP DISPLAY, AND METHOD FOR SUPPRESSING GHOST IMAGE

(71) Applicant: Suzhou Luobo Electronics Tech. Co., Ltd., Suzhou (CN)

(72) Inventor: Binbin Ma, Suzhou (CN)

(73) Assignee: Suzhou Luobo Electronics Tech. Co., Ltd., Suzhou (CN)

(*) Notice: Subject to any disclaimer, the term of this patent is extended or adjusted under 35 U.S.C. 154(b) by 1 day.

(21) Appl. No.: 16/760,449

(22) PCT Filed: Dec. 28, 2017

(86) PCT No.: PCT/CN2017/119158
§ 371 (c)(1),
(2) Date: Apr. 30, 2020

(87) PCT Pub. No.: WO2019/085239
PCT Pub. Date: May 9, 2019

(65) Prior Publication Data
US 2020/0285051 A1 Sep. 10, 2020

(30) Foreign Application Priority Data
Oct. 30, 2017 (CN) .......................... 201711034487.5

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *G02B 2027/011* (2013.01)

(58) Field of Classification Search
CPC ...... G02B 2027/0121; G02B 2027/012; G02B 27/0101; B60K 35/00; B60K 2370/1529
See application file for complete search history.

(56) References Cited

FOREIGN PATENT DOCUMENTS

| CN | 106457773 A | 2/2017 |
|---|---|---|
| CN | 106681004 A | 5/2017 |

(Continued)

OTHER PUBLICATIONS

Shi, CN 106740116 A; Machine Translation into English (Year: 2017).*

*Primary Examiner* — Ryan D Howard
(74) *Attorney, Agent, or Firm* — Bayramoglu Law Offices LLC

(57) ABSTRACT

A windshield head-up display, and a method for suppressing a ghost image are disclosed. The windshield head-up display comprises an image source and a projection assembly. The image source is projected onto a windshield by means of the projection assembly, such that a first virtual image and a second virtual image are formed on the same side of the windshield. The first virtual image is closer to an eye-box region than the second virtual image. The distance from the first virtual image to the eye-box region is an imaging distance. The method comprises: measuring a ghost image value of the first virtual image and the second virtual image upon a change in the imaging distance; and if the imaging distance has increased, reducing the ghost image value of the first virtual image and the second virtual image projected by the projection assembly onto the same side of the windshield.

8 Claims, 6 Drawing Sheets

(56) References Cited

FOREIGN PATENT DOCUMENTS

| | | | |
|---|---|---|---|
| CN | 106740116 | A | 5/2017 |
| CN | 106997096 | A | 8/2017 |
| GB | 2458898 | A | 10/2009 |

* cited by examiner an image source and a projection assembly are disposed in a vehicle, the image source is configured to generate an image, the projection assembly is configured to project the image onto a windshield, such that a first virtual image and a second virtual image are formed on the same side of the windshield, the first virtual image is closer to an eye-box region than the second virtual image, and the distance from the first virtual image to the eye box region is an imaging distance — S100 a ghost image value of the first virtual image and the second virtual image is measured upon a change in the imaging distance — S101 the imaging distance is adjusted, and when the imaging distance has increased, the ghost image value of the first virtual image and the second virtual image projected by the projection assembly onto the same side of the windshield is reduced — S102

Fig. 9

```
┌─────────────────────────────────────────────────────┐
│ an image source and a projection assembly are disposed in a │──S200
│ vehicle, the image source is configured to generate an image, the │
│ projection assembly is configured to project the image onto a │
│ windshield, such that a first virtual image and a second virtual │
│ image are formed on the same side of the windshield, the first │
│ virtual image is closer to an eye-box region than the second │
│ virtual image, and the distance from the first virtual image to │
│ the eye-box region is an imaging distance │
└─────────────────────────────────────────────────────┘
                          │
                          ▼
┌─────────────────────────────────────────────────────┐──S201
│ a ghost image value of the first virtual image and the second │
│ virtual image is measured upon a change in the imaging distance │
└─────────────────────────────────────────────────────┘
                          │
                          ▼
┌─────────────────────────────────────────────────────┐──S202
│ if the imaging distance has increased, the ghost image value of │
│ the first virtual image and the second virtual image projected │
│ by the projection assembly onto the same side of the windshield │
│ is reduced │
└─────────────────────────────────────────────────────┘
                          │
                          ▼
┌─────────────────────────────────────────────────────┐──S203
│ if the imaging distance is within an imaging display range │
│ recognizable for a human eye, the first virtual image is │
│ decomposed into a tangential plane image and a sagittal plane │
│ image by astigmatism adjustment │
└─────────────────────────────────────────────────────┘
                          │
                          ▼
┌─────────────────────────────────────────────────────┐──S204
│ the tangential plane image projected by the projection assembly │
│ onto one side of the windshield is farther from one side of the │
│ eye-box region than the sagittal plane image projected by the │
│ projection assembly onto the same side of the windshield, and │
│ the diopter of the tangential plane image is greater than that │
│ of the sagittal plane image with respect to the human eye │
└─────────────────────────────────────────────────────┘
                          │
                          ▼
┌─────────────────────────────────────────────────────┐──S205
│ an imaging distance from the sagittal plane image of the first │
│ virtual image to the eye-box region is adjusted, and when the │
│ imaging distance has increased, the ghost image value of the │
│ first virtual image and the second virtual image projected by │
│ the projection assembly onto the same side of the windshield │
│ is reduced │
└─────────────────────────────────────────────────────┘
```

Fig. 10

WINDSHIELD HEAD-UP DISPLAY, AND METHOD FOR SUPPRESSING GHOST IMAGE

CROSS REFERENCES TO THE RELATED APPLICATIONS

This application is the national phase entry of International Application No. PCT/CN2017/119158, filed on Dec. 28, 2017, which is based upon and claims priority to Chinese Patent Application No. CN 201711034487.5, filed on Oct. 30, 2017, the entire contents of which are incorporated herein by reference.

TECHNICAL FIELD

The present invention relates to the field of head-up display of vehicles, in particular to a windshield head-up display and a method for suppressing a ghost image.

BACKGROUND

In order to provide convenience for a driver to view vehicle information, navigation information and the like, an HUD (Head Up Display) projects image information near the sight line of the driver in an optical way.

When being projected by the HUD, an image is reflected by a windshield to enter an eye-box region so as to be viewed by the driver. Meanwhile, the driver may see pavement conditions through the windshield. Therefore, the windshield simultaneously has properties of light reflection and light transmittance, the image projected by the HUD may be reflected by two surfaces of the windshield to further form two non-overlapped images which are not beneficial to the viewing of the driver, as shown in FIG. 1 which is a schematic diagram of a ghost image of an ordinary windshield. Generally, we call one of the images a main image (virtual image 1) and the other image a ghost image (virtual image 2), as shown in FIG. 2 which is a schematic diagram of a ghost image viewed by a driver.

At present, ghost image solutions mainly include several ways as follows: the parallelism of two reflection surfaces of the windshield is precisely controlled to ensure that a micro wedge angle exists between the two surfaces, and the micro wedge angle is thick at top and thin at bottom. The two images are overlapped after the image projected by the HUD is reflected. In a specific implementation way, for example, a PVB interlayer inside the windshield is controlled, or a layer of screen protector with a wedge angle is pasted, as shown in FIG. 3 which is a schematic diagram of a wedge-angled windshield without a ghost image. For another example, a coating way is adopted to result in relatively great difference of reflectivity of the two surfaces, for example, the brightness of the main image is enabled to be far higher than that of the ghost image, and furthermore, a relatively dark image is ignored.

For each of the above ghost image solutions, the structure or coating of an external windshield is required to be changed so that the cost is higher.

SUMMARY

The technical problem to be solved by the present invention is to provide a windshield head-up display for suppressing a ghost image under the condition that an original windshield is unchanged.

In order to solve the above-mentioned technical problem, the present invention provides a windshield head-up display configured to display image information by projection, the image information is configured to be projected onto a windshield and enter an eye-box region from the windshield, and the head-up display includes: an image source and a projection assembly;

the image source is projected onto the windshield by means of the projection assembly, such that a first virtual image and a second virtual image are formed on the same side of the windshield, the first virtual image is closer to the eye-box region than the second virtual image, and the distance from the first virtual image to the eye-box region is an imaging distance;

a ghost image value of the first virtual image and the second virtual image is measured upon a change in the imaging distance; and if the imaging distance has increased, the ghost image value of the first virtual image and the second virtual image projected by the projection assembly onto the same side of the windshield is reduced.

The image source is projected onto the windshield by means of the projection assembly: the first virtual image is formed after reflection of an inner surface of the windshield; and the second virtual image is formed after sequentially subjecting to refraction of the inner surface of the windshield, reflection of an outer surface of the windshield and refraction of the inner surface of the windshield. As a common knowledge, the first virtual image is located in front of a human eye and is closer to a human eye than the second virtual image. The diopter of the first virtual image is less than that of the second virtual image with respect to the human eye.

Further, appropriate adjustment of astigmatism enables a tangential plane image of the first virtual image to be farther from one side of the eye-box region than a sagittal plane image and the diopter of the tangential plane image to be greater than that of the sagittal plane image with respect to the human eye, such that a diopter difference exists between the tangential plane image and the sagittal plane image.

Furthermore, an absolute value of the above-mentioned diopter difference is less than or equal to 1 D.

Preferably, an absolute value of the above-mentioned diopter difference is less than or equal to 0.5 D.

Further, when the imaging distance is 30 m, the absolute value of the diopter difference is 0.23 D, and the ghost image value is 1'.

Further, the imaging distance is greater than or equal to 2 m.

Further, a ray generated by an image generation unit is a micro image displayed by any one of modules such as an LCD, an OLED and a DLP.

Preferably, the projection assembly includes: a first reflecting mirror and a second reflecting mirror; and a ray is sequentially reflected by the first reflecting mirror, the second reflecting mirror and the inner surface of the windshield to enter the eye-box region to form the first virtual image. A ray is sequentially projected by the first reflecting mirror, the second reflecting mirror and the inner surface of the windshield, reflected by the outer surface of the windshield and refracted by the inner surface of the windshield to enter the eye-box region to form the second virtual image.

Further, the first reflecting mirror is a curved mirror, and the second reflecting mirror is a plane mirror or a curved mirror.

Preferably, the projection assembly includes: a first reflecting mirror, a second reflecting mirror and a third reflecting mirror.

Further, the surfaces of the first reflecting mirror, the second reflecting mirror and the third reflecting mirror are curved or planar. At least one of the three reflecting mirrors is a curved mirror.

Preferably, the projection assembly includes a first reflecting mirror.

Further, the first reflecting mirror is a curved mirror.

The present invention further provides a method for suppressing a ghost image, an image source and a projection assembly are disposed in a vehicle, the image source is configured to generate an image, the projection assembly is configured to project the image onto a windshield, such that a first virtual image and a second virtual image are formed on the same side of the windshield, the first virtual image is closer to an eye-box region than the second virtual image, the distance from the first virtual image to the eye-box region is an imaging distance, and the method includes: measuring a ghost image value of the first virtual image and the second virtual image upon a change in the imaging distance; and adjusting the imaging distance, and when the imaging distance has increased, reducing the ghost image value of the first virtual image and the second virtual image projected by the projection assembly onto the same side of the windshield.

The image source is projected onto the windshield by means of the projection assembly and is reflected/refracted by the windshield to form the first virtual image and the second virtual image. The imaging distance which is a distance from a sagittal plane image of the first virtual image to the eye-box region is appropriately adjusted, and when the imaging distance has increased, the ghost image value of the first virtual image and the second virtual image is reduced. Appropriate adjustment of astigmatism enables the diopter of a tangential plane image of the first virtual image to be greater than that of the sagittal plane image with respect to the human eye, thereby suppressing a ghost image phenomenon.

Preferably, in the present invention, the singular or simultaneous adoption of two techniques for appropriate adjustment of astigmatism and the imaging distance achieves suppression of the ghost image value.

The present invention has the beneficial effects that:

the windshield head-up display provided by the present invention is relatively long in imaging distance greater than or equal to 4 m, thereby suppressing the ghost image phenomenon. The head-up display is relatively long in imaging distance, and therefore, the ghost image is relatively small. Meanwhile, the astigmatism of the head-up display is appropriately controlled in the present invention, thereby further suppressing the ghost image phenomenon. The tangential plane image of each of the virtual images is located in the eye-box region at the side far from a driver with respect to the sagittal plane image. Preferably, the diopter of the tangential plane image is greater than that of the sagittal plane image with respect to the human eye, the absolute value of a diopter difference is less than or equal to 1 D, and the smaller diopter difference may be accepted by the human eye.

BRIEF DESCRIPTION OF THE DRAWINGS

FIG. 9 is a schematic flow diagram of a method in an embodiment of the present invention; and FIG. 10 is an optimized schematic flow diagram of a method in an embodiment of the present invention.

DETAILED DESCRIPTION OF THE EMBODIMENTS

Figure 1:
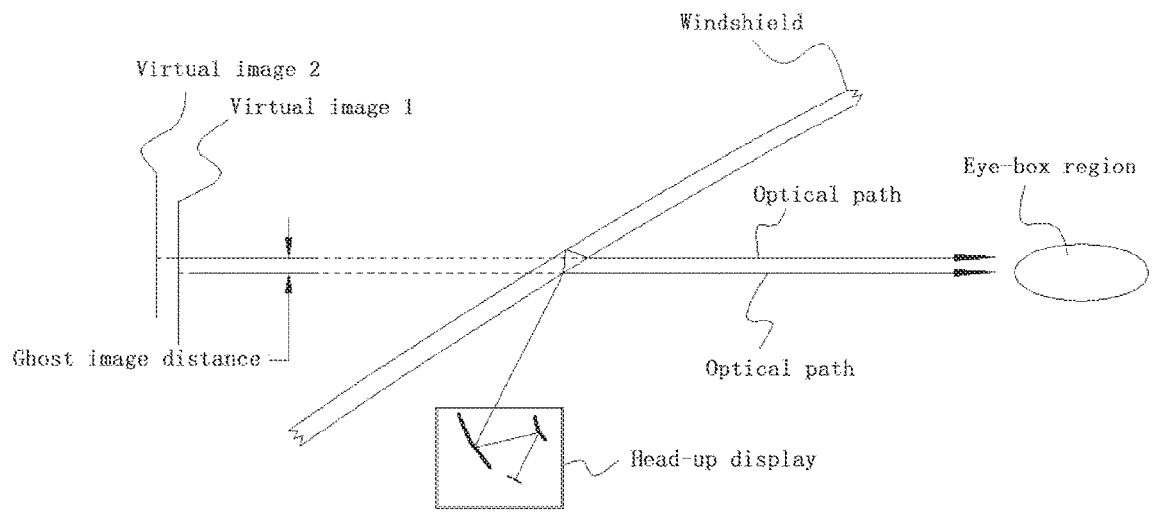
FIG. 1 is a schematic diagram of a ghost image of an ordinary windshield.
Figure 2:
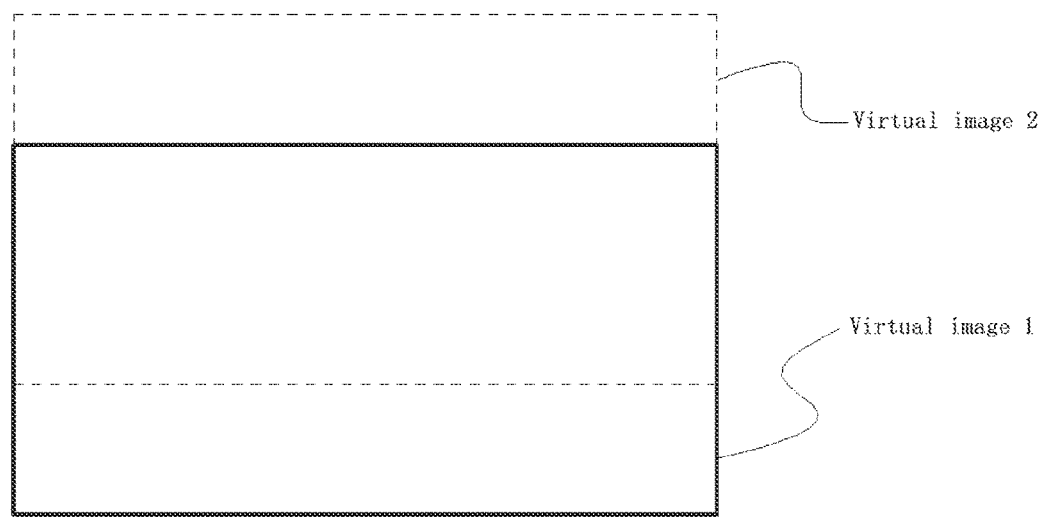
FIG. 2 is a schematic diagram of a ghost image viewed by a driver.
Figure 3:
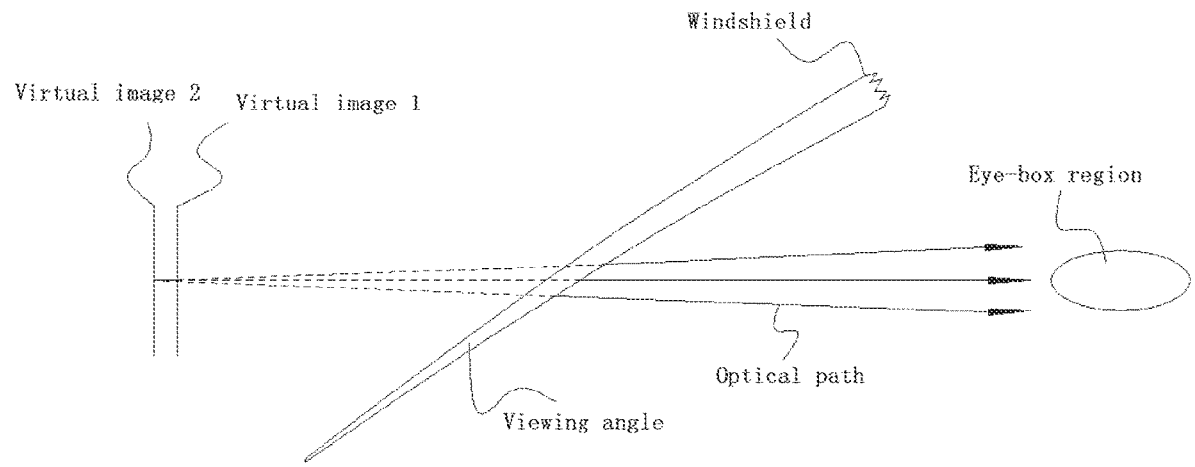
FIG. 3 is a schematic diagram of a wedge-angled windshield without a ghost image.

In order to make objectives, technical solutions and advantages of the present application clearer, the technical solutions in the embodiments of the present application will be described clearly and completely below in conjunction with accompanying drawings in the embodiments of the present application. Obviously, the described embodiments are a part of the embodiments of the present application, not all the embodiments. Based on the embodiments in the present application, all other embodiments obtained by those of ordinary skill in the art without creative work shall fall within the protection scope of the present application.

In the present application, an orientation or position relationship indicated by terms "upper", "lower", "left", "right", "front", "rear", "top", "bottom", "inner", "outer", "middle", "vertical", "horizontal", "transverse", "longitudinal" and the like is based on an orientation or position relationship shown as the accompanying drawings. These terms are intended to better describe the present application and embodiments thereof, rather than to limit that the indicated devices, elements or components have specific orientations or are structured or operated according to the specific orientations.

Moreover, parts of the above terms may also be used for indicating other meanings in addition to indication for the orientation or position relationship, for example, the term "upper" may also be used for indicating a certain attachment or connection relationship in some situations. The specific meanings of these terms in the present application can be understood by the those of ordinary skill in the art according to specific situations.

In addition, terms "mounted", "arranged", "provided", "connected", "connection" and "sleeved" should be understood in a broad sense. For example, "connection" may be fixed connection or detachable connection or an integral structure, may be mechanical connection or electrical connection, may be direct connection or indirect connection through an intermediate medium, and may be internal connection of two devices, elements or components. For those of ordinary skill in the art, the specific meanings of the above terms in the present application may be understood according to specific situations.

A ghost image in the present application means that an image projected by an HUD may be reflected by inner and outer surfaces of a windshield to further form two non-overlapped images. An offset of the two images in a vertical direction is a ghost image distance with a distance value as a unit such as mm. A field angle of the ghost image relative to a human eye is defined as a ghost image value, the larger the field angle is, the more the field angle is easily detected by the human eye.

The diopter in the present application means that macroscopical optical instruments are suitable for various persons with different visions, such that the formed image is no longer located at infinity, but is located on a certain distance in front or at the rear of the human eye to meet the requirement of myopia or hyperopia, and the diopter is used as a unit and is denoted by a symbol D. The diopter is denoted by a reciprocal of a distance, for example, the diopter is 0 D when the image is located at infinity, the diopter is −1 D when the image is located at a position 1 m away from the front of the human eye, the diopter is −0.25 D when the image is located on a position 4 m away from the front of the human eye, and the diopter is 0.25 D when the image is located at a position 4 m away from the rear of the human eye.

Figure 4:
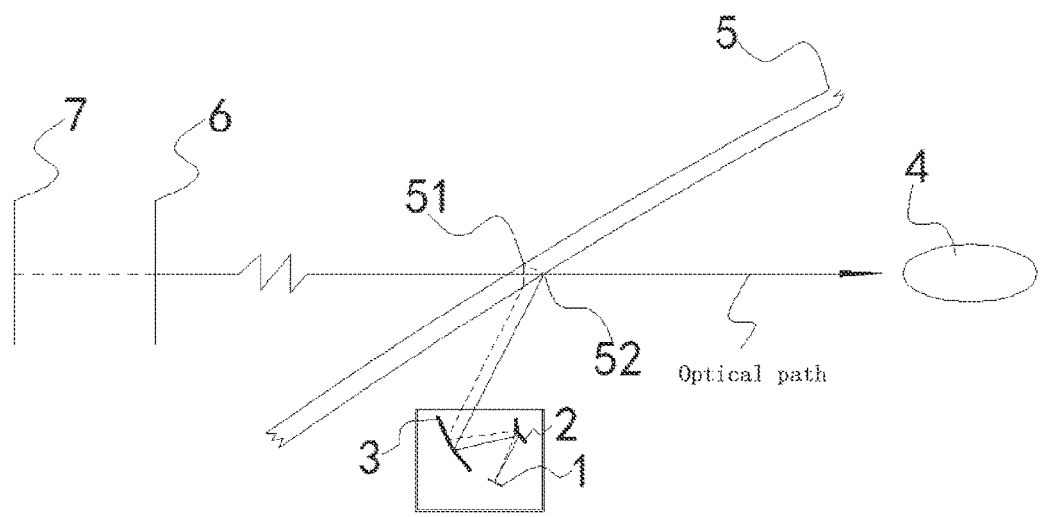
FIG. 4 is a schematic structural diagram of a windshield head-up display in an embodiment of the present invention.

Referring to FIG. 4 which is a schematic structural diagram of a windshield head-up display in an embodiment of the present invention, the windshield head-up display in the present embodiment is configured to display image information by projection, the image information is configured to be projected onto a windshield and enter an eye-box region from the windshield, and the head-up display includes: an image source 1 and a projection assembly (2, 3 and 5); the image source is projected onto the windshield 5 by means of the projection assembly, such that a first virtual image 6 and a second virtual image 7 are formed on the same side of the windshield, the first virtual image 6 is closer to the eye-box region than the second virtual image 7, and the distance from the first virtual image 6 to the eye-box region is an imaging distance; a ghost image value of the first virtual image and the second virtual image is measured upon a change in the imaging distance; and if the imaging distance has increased, the ghost image value of the first virtual image and the second virtual image projected by the projection assembly onto the same side of the windshield is reduced. The windshield head-up display in the present embodiment is longer in imaging distance greater than or equal to 4 m, thereby suppressing the ghost image phenomenon. The head-up display is relatively long in imaging distance, and therefore, the ghost image is relatively small. Specifically, in the present embodiment, a distance from the center of the first virtual image 6 to the center of the eye-box region 4 is defined as the imaging distance. In addition, due to the adoption of the windshield head-up display in the present embodiment, the use cost of a product is reduced. The windshield is not required to be specially customized, and the inner and outer surfaces of the windshield are parallel without wedge angles. A special coating is not needed.

In some embodiments, the first virtual image projected by the projection assembly onto one side of the windshield includes: a tangential plane image and a sagittal plane image; the tangential plane image is farther from one side of the eye-box region than the sagittal plane image; and the diopter of the tangential plane image is greater than that of the sagittal plane image with respect to a human eye. The ghost image phenomenon is further suppressed by appropriately controlling the astigmatism of the head-up display. The tangential plane image of each of the virtual images is located in the eye-box region at the side far from the driver with respect to the sagittal plane image.

In some embodiments, the projection assembly further includes: a first reflecting mirror and a second reflecting mirror;

a step that the image source is projected onto the windshield by means of the projection assembly, such that the first virtual image and the second virtual image are formed on the same side of the windshield includes:

a ray generated by the image source is sequentially reflected by the first reflecting mirror, the second reflecting mirror and an inner surface of the windshield to enter the eye-box region to form the first virtual image; and a ray generated by the image source is sequentially projected by the first reflecting mirror, the second reflecting mirror and the inner surface of the windshield, reflected by an outer surface of the windshield and refracted by the inner surface of the windshield to enter the eye-box region to form the second virtual image.

In some embodiments, the projection assembly includes: a first reflecting mirror, a second reflecting mirror and a third reflecting mirror, and at least one of the first reflecting mirror, the second reflecting mirror and the third reflecting mirror is a curved mirror.

The windshield is relatively large in curvature radius and has parallel front and rear surfaces. Therefore, a certain distance from the first virtual image 6 to the second virtual image 7 formed by projection exists along a sight line direction of the driver, the second virtual image 7 is located at the side farther from the driver, and the first virtual image 6 is located at the side closer to the driver, and the distance is generally decided by parameters and the like of the windshield and is generally about 15 mm.

As a preference in the present embodiment, the projection assembly (2, 3 and 5) includes a first reflecting mirror 2, a second reflecting mirror 3 and a windshield 5, and a ray is sequentially reflected by the first reflecting mirror 2, the second reflecting mirror 3 and an inner surface of the windshield 5 to enter the eye-box region 4 to form the first virtual image 6.

As a preference in the present embodiment, the ray is sequentially projected by the first reflecting mirror 2, the second reflecting mirror 3 and the inner surface of the windshield 5, reflected by an outer surface of the windshield 5 and refracted by the inner surface of the windshield 5 to enter the eye-box region 4 to form the second virtual image 7.

The above-mentioned windshield head-up display is configured to display a projection to form the virtual images in front of a vehicle and near the sight line of the driver.

Figure 7:
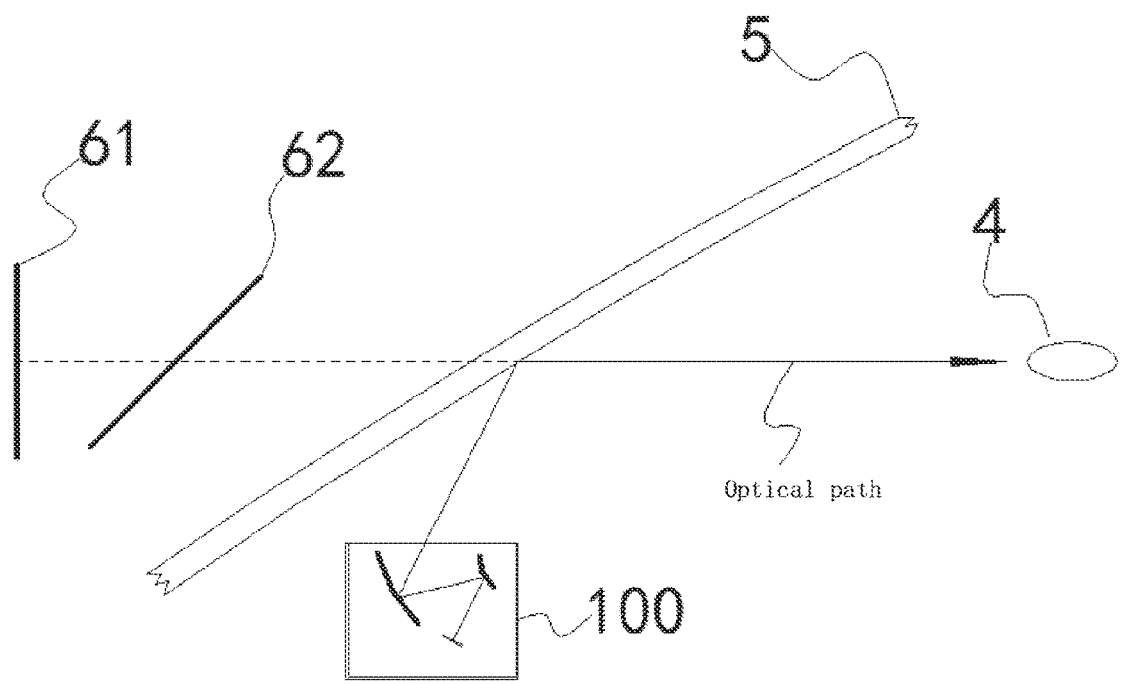
FIG. 7 is a schematic diagram of astigmatism control in an embodiment of the present invention.

As shown in FIG. 7, as a preference in the present embodiment, a tangential plane image 61 of the first virtual image 6 is farther from one side of the eye-box region 4 than a sagittal plane image 62, and the diopter of the tangential plane image is greater than that of the sagittal plane image with respect to the human eye. Preferably, an absolute value of the above-mentioned diopter difference is less than or equal to 0.5 D. The imaging distance of the head-up display in the present embodiment is greater than 4 m, and the tangential plane (in a vertical direction) image is located at the side far from the driver with respect to the sagittal plane (in a horizontal direction) image, so that a use demand is met. The windshield is not required to be specially customized, and the inner and outer surfaces of the windshield are parallel without wedge angles. A special coating is not needed.

As a preference in the present embodiment, when the imaging distance is 30 m, the absolute value of the diopter difference is 0.23 D, and the ghost image value is 1' and is close to the limit resolution level of the human eye.

In the present embodiment, a micro image source is not specifically limited, includes, but is not limited to a micro image displayed by modules such as an LCD, an OLED and a DLP. The first reflecting mirror is a curved mirror, and the second reflecting mirror is a plane mirror or a curved mirror.

Figure 8:
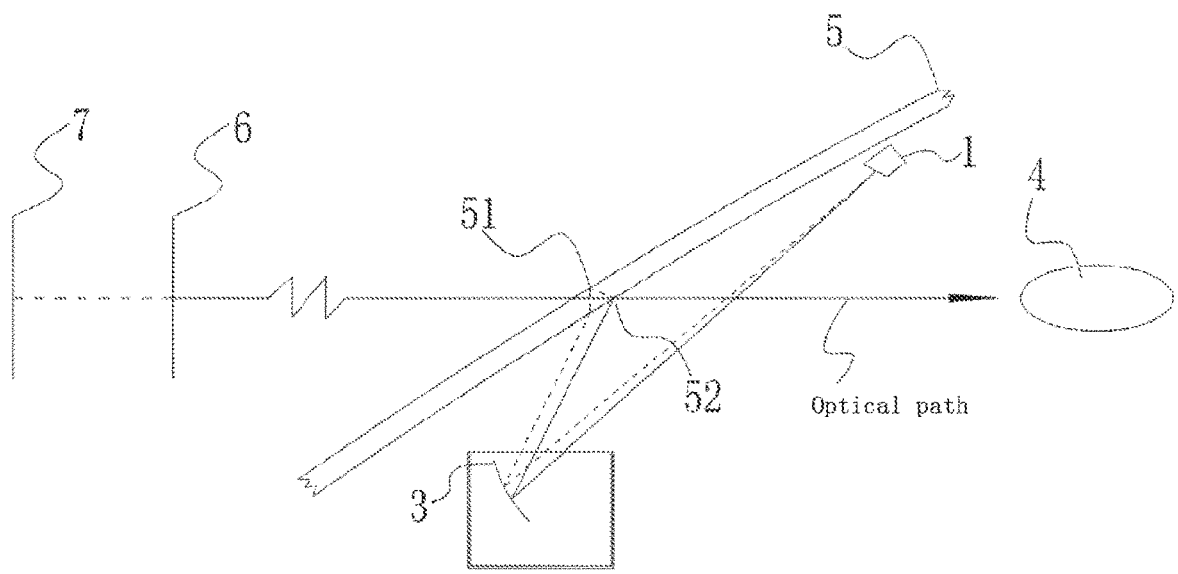
FIG. 8 is a schematic layout diagram of an embodiment of the present invention.

The structure of the projection assembly in the present embodiment may have different layout ways and may be in other forms in addition to the way in which the two reflecting mirrors in the above-mentioned embodiment are adopted, for example, a projection assembly composed of three reflecting mirrors and a projection assembly composed of one reflecting mirror are adopted. As shown in FIG. 8 which is a schematic structural diagram of a reflecting mirror, the image source 1 is located above the windshield of a vehicle, and the reflecting mirror is numbered with 3.

As shown in FIG. 9, another embodiment of this application provides a method for suppressing a ghost image based on the above, including the following steps:

S100, an image source and a projection assembly are disposed in a vehicle, the image source is configured to generate an image, the projection assembly is configured to project the image onto a windshield, such that a first virtual image and a second virtual image are formed on the same side of the windshield, the first virtual image is closer to an eye-box region than the second virtual image, the distance from the first virtual image to the eye-box region is an imaging distance;

S101, a ghost image value of the first virtual image and the second virtual image is measured upon a change in the imaging distance; and S102, the imaging distance is adjusted, and when the imaging distance has increased, the ghost image value of the first virtual image and the second virtual image projected by the projection assembly onto the same side of the windshield is reduced.

In the S101, specifically, the projection assembly further includes: a first reflecting mirror and a second reflecting mirror;

the step that the image source is projected onto the windshield by means of the projection assembly, such that the first virtual image and the second virtual image are formed on the same side of the windshield includes:

a ray generated by the image source is sequentially reflected by the first reflecting mirror, the second reflecting mirror and an inner surface of the windshield to enter the eye-box region to form the first virtual image; and a ray generated by the image source is sequentially projected by the first reflecting mirror, the second reflecting mirror and the inner surface of the windshield, reflected by an outer surface of the windshield and refracted by the inner surface of the windshield to enter the eye-box region to form the second virtual image.

In the S101, specifically, the projection assembly includes: a first reflecting mirror, a second reflecting mirror and a third reflecting mirror; and at least one of the first reflecting mirror, the second reflecting mirror and the third reflecting mirror is a curved mirror.

In the S101, specifically, the projection assembly includes: a first reflecting mirror.

The first reflecting mirror is a curved mirror.

As commonly known by those skilled in the art, the number and layout forms of the reflecting mirrors may be appropriately adjusted on the basis of meeting the imaging distance and the astigmatism, but are not listed one by one.

In the S102, preferably, a tangential plane image of the first virtual image is farther from one side of the eye-box region than the sagittal plane image, and the diopter of the tangential plane image is greater than that of the sagittal plane image with respect to the human eye.

Preferably, an absolute value of the above-mentioned diopter difference is less than or equal to 0.5 D.

In the S102, preferably, when the imaging distance is 30 m, the absolute value of the diopter difference is 0.23 D, and the ghost image value is 1'.

In the S102, preferably, the imaging distance is greater than or equal to 2 m.

In the above-mentioned step, a ray generated by an image generation unit is a micro image displayed by any one of modules such as an LCD, an OLED and a DLP.

In the above-mentioned step, the first reflecting mirror is a curved mirror, and the second reflecting mirror is a plane mirror or a curved mirror.

Referring to FIG. 10, as a preference in the present embodiment, a method for suppressing a ghost image in the present embodiment includes:

S200, an image source and a projection assembly are disposed in a vehicle, the image source is configured to generate an image, the projection assembly is configured to project the image onto a windshield, such that a first virtual image and a second virtual image are formed on the same side of the windshield, the first virtual image is closer to an eye-box region than the second virtual image, the distance from the first virtual image to the eye-box region is an imaging distance;

S201, a ghost image value of the first virtual image and the second virtual image is measured upon a change in the imaging distance;

S202, if the imaging distance has increased, the ghost image value of the first virtual image and the second virtual image projected by the projection assembly onto the same side of the windshield is reduced;

S203, if the imaging distance is within an imaging display range recognizable for a human eye, the first virtual image is decomposed into a tangential plane image and a sagittal plane image by astigmatism adjustment;

S204, the tangential plane image projected by the projection assembly onto one side of the windshield is farther from one side of the eye-box region than the sagittal plane image projected by the projection assembly onto the same side of the windshield, and the diopter of the tangential plane image is greater than that of the sagittal plane image with respect to the human eye; and S205, an imaging distance from the sagittal plane image of the first virtual image to the eye-box region is adjusted, and when the imaging distance has increased, the ghost image value of the first virtual image and the second virtual image projected by the projection assembly onto the same side of the windshield is reduced.

According to the above-mentioned method for suppressing the ghost image, the imaging distance which is a distance from the sagittal plane image of the first virtual image to the eye-box region is appropriately adjusted, and therefore, when the imaging distance has increased, the ghost image value of the first virtual image and the second virtual image is reduced. Appropriate adjustment of astigmatism enables the diopter of the tangential plane image of the first virtual image to be greater than that of the sagittal plane image with respect to the human eye, thereby suppressing a ghost image phenomenon.

Design parameters in the following embodiments are intended to explain the implementation principle of the present application.

Embodiment 1

Figure 5:
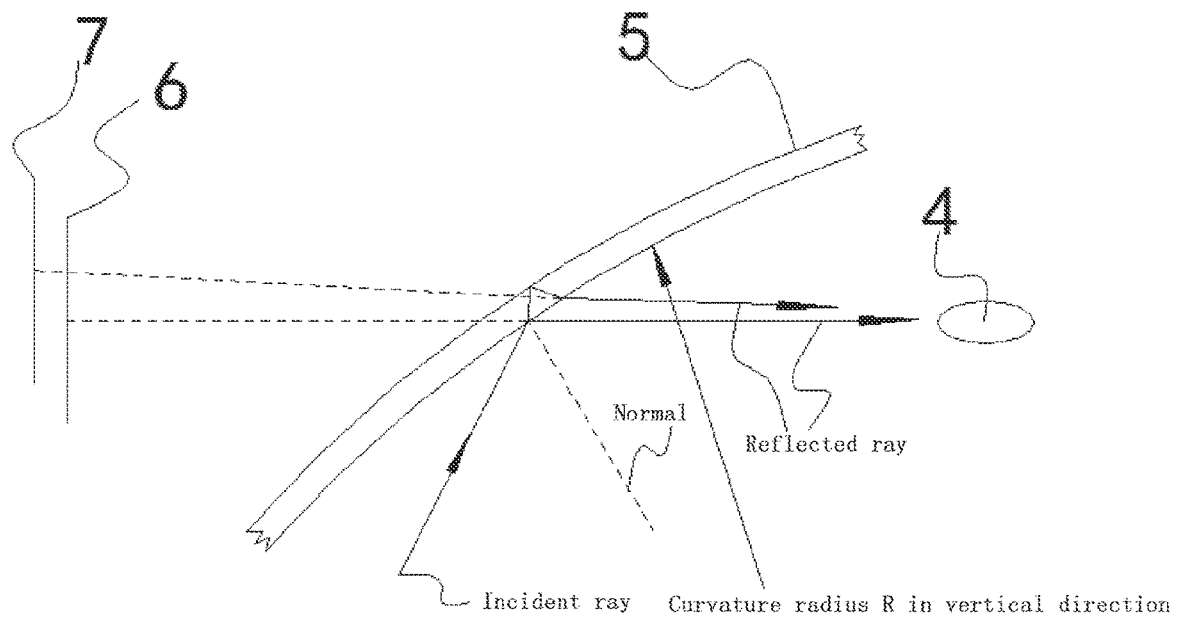
FIG. 5 is a schematic diagram of a ray in FIG. 4.

As shown in FIG. 5, the windshield head-up display in the present embodiment is configured to display image information by projection and includes: an image source 1 and a projection assembly (2, 3 and 5), the image source 1 is projected by means of the projection assembly to form a first virtual image 6 and a second virtual image 7, when an imaging distance has increased, a ghost image value of the first virtual image 6 and the second virtual image 7 is reduced, and a distance from the first virtual image 6 to an eye-box region 4 is an imaging distance. The imaging distance of an ordinary head-up display in the prior art is about 2 m, thereby resulting in a large ghost image. The windshield head-up display in the present embodiment is relatively long in imaging distance greater than or equal to 4 m. The longer the imaging distance is, the smaller the ghost image value is. As a preference in the present embodiment, the projection assembly (2, 3 and 5) includes a first reflecting mirror 2, a second reflecting mirror 3 and a windshield 5, and a ray is sequentially reflected by the first reflecting mirror 2, the second reflecting mirror 3 and an inner surface of the windshield 5 to enter the eye-box region 4 to form the first virtual image 6.

As a preference in the present embodiment, a ray is sequentially projected by the first reflecting mirror 2, the second reflecting mirror 3 and the inner surface of the windshield 5, reflected by an outer surface of the windshield 5 and refracted by the inner surface of the windshield 5 to enter the eye-box region 4 to form the second virtual image 7.

A ghost image distance is composed of two parts, one part is caused by the thickness factor of glass according to a principle which is commonly known by those skilled in the art, namely image offset since a ray penetrates through a flat plate. One part of the ghost image value is partly caused by the bending of the windshield, the windshield has a certain curvature radius in a vertical direction, for a ray incident from the head-up display, a micro included angle exists between rays reflected by front and rear surfaces of the windshield, and the included angle is a second part of the ghost image value. The ghost image value is relevant to the thickness, refractive index and curvature radius of the windshield. The two parts of ghost image value are superimposed, finally, the first part of ghost image is weakened with the increment of the imaging distance, and the total ghost image value is reduced.

The imaging distance of the head-up display in the present embodiment is 5.5 m, relevant parameters are shown as Table 1, and the ghost image value is calculated to be less than or equal to 5'. The ghost image value is reduced with the increment of the imaging distance.

TABLE 1

| | |
|---|---|
| Imaging distance | 5.5 m |
| Curvature radius in vertical direction | 7000 mm |
| Distance from a human eye to glass | 750 mm |
| Refractive index | 1.519 |
| Thickness | 4.76 mm |
| Incident angle | 550 |
| Ghost image value | 3.9' |

The first reflecting mirror in the present embodiment is a plane mirror, plays a role in folding an optical path and is unshown in a design document. When the imaging distance is 5.5 m, relevant parameters are shown as Table 2 below:

TABLE 2

| Serial number | Notes | Surface type | Radius | Thickness | Tilt in X direction | Curvature radius in X direction | Eccentricity in Y direction |
|---|---|---|---|---|---|---|---|
| 0 | | Object (object surface) | | −5500 | | | |
| 1 | Human eye | ST0 | | 750 | | | |
| 2 | Windshield | Biconic (Biconic surface) | −7000 | −120 | −55° | −4000 | |
| 3 | | Coordinate Break (Coordinate breakpoint) | | | −55° | | −171.378 |
| 4 | | Coordinate Break | | | −20° | | |
| 5 | Second reflecting mirror | Anamorphic (Curved surface of tire) | | 225 | | | |
| 6 | | Coordinate Break | | | −20° | | 81.893 |
| 7 | | Image (Image surface) | | | | | |

A surface type formula of the second reflecting mirror:

$$Z = \frac{CxX^2 + CyY^2}{1 + \sqrt{1 - (1 + Kx)(Cx^2 X^2) - (1 + Ky)(Cy^2 Y^2)}}$$

TABLE 3

| Cx | Cy | Kx | Ky |
|---|---|---|---|
| 1.94E−03 | 1.58E−03 | 20.779 | −148.095 |

Embodiment 2

As shown in FIG. 7, a windshield head-up display in the present embodiment is configured to display image information by projection and includes: an image source 1 and a projection assembly (2, 3 and 5), the image source 1 is projected by means of the projection assembly to form a first virtual image 6 and a second virtual image 7, when an imaging distance has increased, a ghost image value of the first virtual image 6 and the second virtual image 7 is reduced, and a distance from the first virtual image 6 to an eye-box region 4 is the imaging distance. As a preference in the present embodiment, a tangential plane image 61 of the first virtual image 6 is farther from one side of the eye-box region 4 than a sagittal plane image 62, and the diopter of the tangential plane image 61 is greater than that of the sagittal plane image 62 with respect to a human eye. As a preference in the present embodiment, the projection assembly (2, 3 and 5) includes a first reflecting mirror 2, a second reflecting mirror 3 and a windshield 5, and a ray is sequentially reflected by the first reflecting mirror 2, the second reflecting mirror 3 and an inner surface of the windshield 5 to enter the eye-box region 4 to form the first virtual image 6.

As a preference in the present embodiment, a ray is sequentially projected by the first reflecting mirror 2, the second reflecting mirror 3 and the inner surface of the windshield 5, reflected by an outer surface of the windshield 5 and refracted by the inner surface of the windshield 5 to enter the eye-box region 4 to form the second virtual image 7.

According to a method for suppressing the ghost image by controlling the windshield head-up display in the present embodiment, the tangential plane (in a vertical direction) image 61 of the first virtual image 6 is located at the side far from a driver with respect to the sagittal plane (in a horizontal direction) image 62. The diopter of the tangential plane image 61 is greater than that of the sagittal plane image 62 with respect to a human eye, and an absolute value of a diopter difference is less than or equal to 0.5 D.

As a preference in the present embodiment, the absolute value of the above-mentioned diopter difference is less than or equal to 0.5 D.

As a preference in the present embodiment, when the imaging distance is 30 m, the absolute value of the diopter difference is 0.23 D, and the ghost image value is 1'.

Figure 6:
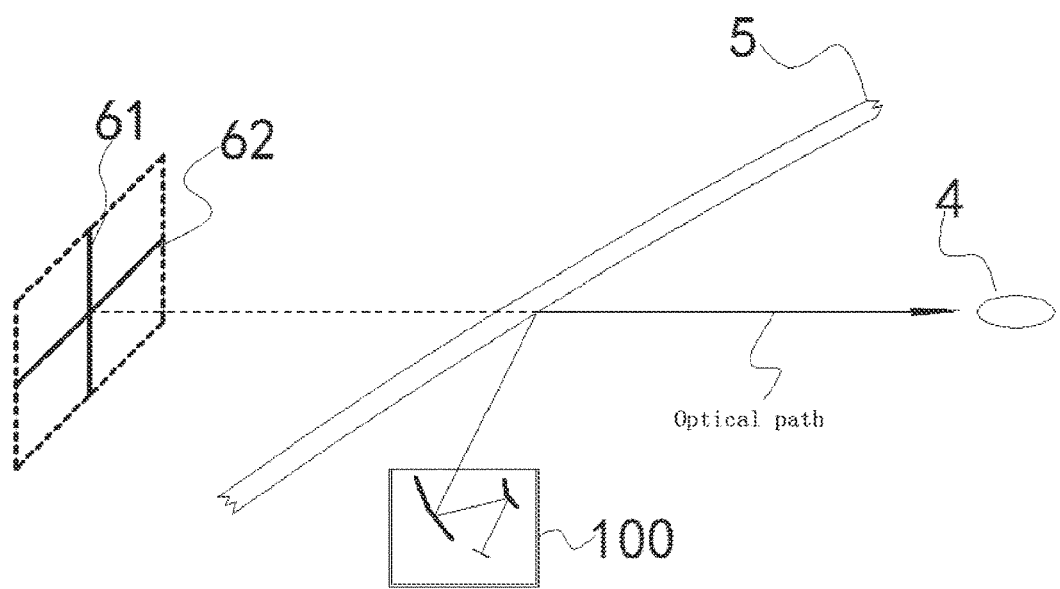
FIG. 6 is a schematic diagram of conventional astigmatism control.

In the prior art, in order to appropriately control astigmatism, the tangential plane image and the sagittal plane image of the virtual images in a conventional head-up display are shown as the following FIG. 6, the imaging distances of the tangential plane image and the sagittal plane image are equal.

In the present embodiment, the tangential plane (in the vertical direction) image of each of the virtual images is located at the side far from the driver with respect to the sagittal plane (in the horizontal direction) image. At the moment, the diopter of the tangential plane image is greater than that of the sagittal plane image with respect to the human eye, and the absolute value of the diopter difference is less than or equal to 0.5 D, as shown in FIG. 7.

The imaging distance of the head-up display in the present embodiment is 4 m, and the tangential plane (in the vertical direction) image is located at the side far from the driver with respect to the sagittal plane (in the horizontal direction) image. The absolute value of the diopter difference is 0.25 D, and the ghost image value is 2.4', and therefore, the use demand is met, as shown in table 4.

TABLE 4

| | |
|---|---|
| Imaging distance of sagittal plane image | 4 m |
| Diopter difference of tangential and sagittal plane images | 0.25 D |
| Curvature radius in vertical direction | 7000 mm |
| Distance from a human eye to glass | 750 mm |
| Refractive index | 1.519 |
| Thickness | 4.76 mm |
| Incident angle | 550 |
| Ghost image value | 2.4' |

The first reflecting mirror in the present embodiment is a plane mirror and plays a role in folding an optical path. Relevant parameters are shown as Table 6 below:

TABLE 5

| Serial number | Notes | Surface type | Radius | Thickness | Tilt in X direction | Curvature radius in X direction | Eccentricity in Y direction |
|---|---|---|---|---|---|---|---|
| 0 | | object | | | | | |
| 1 | Human eye | ST0 | | 750 | | | |
| 2 | Windshield | Biconic | −7000 | −120 | −55° | −4000 | |
| 3 | | Coordinate Break | | | −55° | | −171.378 |
| 4 | | Coordinate Break | | | −20° | | |
| 5 | Second reflecting mirror | Anamorphic | | 240 | | | |
| 6 | | Coordinate Break | | | −20° | | 87.353 |
| 7 | | Image | | | | | |

A surface type formula of the second reflecting mirror:

$$Z = \frac{CxX^2 + CyY^2}{1 + \sqrt{1 - (1 + Kx)(Cx^2X^2) - (1 + Ky)(Cy^2Y^2)}}$$

TABLE 6

| Cx | Cy | Kx | Ky |
|---|---|---|---|
| 1.727E−03 | 1.578E−03 | 20.779 | −148.095 |

Embodiment 3

A windshield head-up display in the present embodiment is configured to display image information by projection and includes: an image source 1 and a projection assembly (2, 3 and 5), the image source 1 is projected by means of the projection assembly to form a first virtual image 6 and a second virtual image 7, when an imaging distance has increased, a ghost image value of the first virtual image 6 and the second virtual image 7 is reduced, and a distance from the first virtual image 6 to an eye-box region 4 is the imaging distance. As a preference in the present embodiment, the projection assembly (2, 3 and 5) includes a first reflecting mirror 2, a second reflecting mirror 3 and a windshield 5, and a ray is sequentially reflected by the first reflecting mirror 2, the second reflecting mirror 3 and an inner surface of the windshield 5 to enter the eye-box region 4 to form the first virtual image 6.

As a preference in the present embodiment, a ray is sequentially projected by the first reflecting mirror 2, the second reflecting mirror 3 and the inner surface of the windshield 5, reflected by an outer surface of the windshield 5 and refracted by the inner surface of the windshield 5 to enter the eye-box region 4 to form the second virtual image 7.

The imaging distance and an absolute value of a diopter difference are further appropriately selected, the imaging distance is 30 m, and a tangential plane (in a vertical direction) image is located at the side far from a driver with respect to a sagittal plane (in a horizontal direction) image. The absolute value of the diopter difference is 0.23 D, and the ghost image value is reduced to 1' and is close to the limit resolution level of a human eye.

TABLE 7

| | |
|---|---|
| Imaging distance of sagittal plane image | 30 m |
| Diopter difference of tangential and sagittal plane images | 0.23 D |
| Curvature radius in vertical direction | 7000 mm |
| Distance from human eye to glass | 750 mm |
| Refractive index | 1.519 |
| Thickness | 4.76 mm |
| Incident angle | 550 |
| Ghost image value | 1' |

The first reflecting mirror in the present embodiment is a plane mirror and plays a role in folding an optical path. Relevant parameters are shown as Table 8 below:

TABLE 8

| Serial number | Notes | Surface type | Radius | Thickness | Tilt in X direction | Curvature radius in X direction | Eccentricity in Y direction |
|---|---|---|---|---|---|---|---|
| 0 | | object | | | | | |
| 1 | Human eye | ST0 | | 750 | | | |
| 2 | Windshield | Biconic | −7000 | −120 | −55° | −4000 | |
| 3 | | Coordinate Break | | | −55° | | −171.378 |
| 4 | | Coordinate Break | | | −20° | | |
| 5 | Second reflecting mirror | Anamorphic | | 277.15 | | | |
| 6 | | Coordinate Break | | | −20° | | 87.353 |
| 7 | | Image | | | | | |

A surface type formula of the second reflecting mirror:

$$Z = \frac{CxX^2 + CyY^2}{1 + \sqrt{1 - (1 + Kx)(Cx^2X^2) - (1 + Ky)(Cy^2Y^2)}}$$

TABLE 9

| Cx | Cy | Kx | Ky |
|---|---|---|---|
| 1.672E−03 | 1.456E−03 | −12.47 | −183.08 |

The above description is merely used as preferred embodiments, and is not intended to limit the present application. Various alterations and variations on the present application can be made by those skilled in the art. Any alternations, equivalent replacements, improvement, etc., within the spirit and principle of the present application should fall within the protection scope of the present application.

What is claimed is:

1. A windshield head-up display, configured to display image information by projection, wherein the image information is configured to be projected onto a windshield and enter an eye-box region from the windshield, and the windshield head-up display comprises: an image source and a projection assembly, wherein the image source is projected onto the windshield by means of the projection assembly, such that a first virtual image and a second virtual image are formed on a same side of the windshield, the first virtual image is closer to the eye-box region than the second virtual image, a distance from the first virtual image to the eye-box region is an imaging distance;

a ghost image value of the first virtual image and the second virtual image is measured upon a change in the imaging distance; and when the imaging distance has increased, the ghost image value of the first virtual image and the second virtual image projected by the projection assembly onto the same side of the windshield is reduced, wherein the first virtual image projected by the projection assembly onto one side of the windshield comprises: a tangential plane image and a sagittal plane image;

the tangential plane image is farther from one side of the eye-box region than the sagittal plane image; and a diopter of the tangential plane image is greater than a diopter of the sagittal plane image with respect to a human eye.

2. The windshield head-up display of claim 1, wherein the projection assembly comprises: a first reflecting mirror and a second reflecting mirror;

a step wherein the image source is projected onto the windshield by means of the projection assembly, such that the first virtual image and the second virtual image are formed on the same side of the windshield comprises:

a ray generated by the image source is sequentially reflected by the first reflecting mirror, the second reflecting mirror and an inner surface of the windshield to enter the eye-box region to form the first virtual image; and the ray generated by the image source is sequentially projected by the first reflecting mirror, the second reflecting mirror and the inner surface of the windshield, reflected by an outer surface of the windshield and refracted by the inner surface of the windshield to enter the eye-box region to form the second virtual image.

3. The windshield head-up display of claim 1, wherein the projection assembly comprises: a first reflecting mirror, a second reflecting mirror and a third reflecting mirror, and at least one of the first reflecting mirror, the second reflecting mirror and the third reflecting mirror is a curved mirror.

4. The windshield head-up display of claim 1, wherein the projection assembly comprises: a first reflecting mirror, and the first reflecting mirror is a curved mirror.

5. The windshield head-up display of claim 1, wherein the ghost image value of the first virtual image and the second virtual image is measured upon a change in the imaging distance, and the imaging distance is greater than or equal to 2 m.

6. A method for suppressing a ghost image, wherein an image source and a projection assembly are disposed in a vehicle, the image source is configured to generate an image, the projection assembly is configured to project the image onto a windshield, such that a first virtual image and a second virtual image are formed on a same side of the windshield, the first virtual image is closer to an eye-box region than the second virtual image, a distance from the first virtual image to the eye-box region is an imaging distance, and the method comprises:

measuring a ghost image value of the first virtual image and the second virtual image upon a change in the imaging distance; and adjusting the imaging distance, and when the imaging distance has increased, reducing the ghost image value of the first virtual image and the second virtual image projected by the projection assembly onto the same side of the windshield, wherein the first virtual image is decomposed into a tangential plane image and a sagittal plane image by an astigmatism adjustment within an imaging display range of the imaging distance;

the tangential plane image projected by the projection assembly onto one side of the windshield is farther from one side of the eye-box region than the sagittal plane image projected by the projection assembly onto the same side of the windshield; and a diopter of the tangential plane image is greater than a diopter of the sagittal plane image with respect to a human eye.

7. The method of claim 6, wherein the projection assembly is configured to comprise: a first reflecting mirror and a second reflecting mirror;

a step wherein the image source is projected onto the windshield by means of the projection assembly, such that the first virtual image and the second virtual image are formed on the same side of the windshield comprises:

a ray generated by the image source is sequentially reflected by the first reflecting mirror, the second reflecting mirror and an inner surface of the windshield to enter the eye-box region to form the first virtual image; and the ray generated by the image source is sequentially projected by the first reflecting mirror, the second reflecting mirror and the inner surface of the windshield, reflected by an outer surface of the windshield and refracted by the inner surface of the windshield to enter the eye-box region to form the second virtual image.

8. The method of claim 6, further comprises:

when the imaging distance is within an imaging display range recognizable for a human eye, decomposing the first virtual image into the tangential plane image and the sagittal plane image by the astigmatism adjustment;

enabling the tangential plane image projected by the projection assembly onto one side of the windshield to be farther from one side of the eye-box region than the sagittal plane image projected by the projection assembly onto the same side of the windshield;

enabling the diopter of the tangential plane image to be greater than the diopter of the sagittal plane image with respect to the human eye; and adjusting the imaging distance from the sagittal plane image of the first virtual image to the eye-box region, and when the imaging distance increases, reducing the ghost image value of the first virtual image and the second virtual image projected by the projection assembly onto the same side of the windshield.

* * * * *